United States Patent [19]

Shimizu et al.

[11] Patent Number: 4,749,765
[45] Date of Patent: Jun. 7, 1988

[54] METHOD FOR PRODUCING SILICONE RUBBER POWDER

[75] Inventors: Koji Shimizu; Mitsuo Hamada, both of Chiba, Japan

[73] Assignee: Toray Silicone Co., Ltd., Tokyo, Japan

[21] Appl. No.: 84,068

[22] Filed: Aug. 11, 1987

[30] Foreign Application Priority Data

Jul. 10, 1986 [JP] Japan ................ 61-162421

[51] Int. Cl.$^4$ .......................................... G08G 77/06
[52] U.S. Cl. ...................................... 528/15; 528/31; 528/32; 528/33; 528/24; 528/34; 525/478
[58] Field of Search ................ 528/15, 31, 33, 32, 528/34, 24; 525/478

[56] References Cited

U.S. PATENT DOCUMENTS 4,594,134  6/1986  Hanada et al. .................. 528/15

FOREIGN PATENT DOCUMENTS 2129820  5/1984  United Kingdom .

*Primary Examiner*—Melvyn I. Marquis
*Attorney, Agent, or Firm*—Robert Spector

[57] ABSTRACT

This invention provides a method for preparing cured silicone rubber powder exhibiting a uniformly small particle size. The powder is prepared by (1) blending the ingredients of a curable liquid silicone rubber composition at a temperature of from −60° to +5° C. and (2) spraying said composition in particulate form into air heated to a temperature of from +80° to 200° C. to cure the resultant particles.

4 Claims, No Drawings

METHOD FOR PRODUCING SILICONE RUBBER POWDER

BACKGROUND OF THE INVENTION

1. Field of the Invention

The present invention relates to a method for producing a cured silicone rubber. More particularly, this invention relates to a method for preparing a cured silicone rubber powder of uniform shape and small particle size.

2. Description of the Prior Art

It is known from the disclosure in British Published Application. No. 2,129,820 that silicone rubber powder can be produced by spraying a thermosetting organopolysiloxane composition into hot air to effect curing. The temperature of the air is generally from 150° to 350° C. The disadvantage of this prior art method is that in order to produce a uniformly cured silicone rubber powder, curing must be carried out at temperatures much above the normal curing temperature of the sprayed organopolysiloxane. The disadvantages of this method include the cost of the apparatus and the energy required for curing the composition. Furthermore, while a very finely divided powder can be prepared using this method, it is difficult to produce uniformly shaped particles.

Accordingly, the present inventors carried out an investigation in order to eliminate the above problems, and the present invention was developed as a consequence. The objective of this invention is to define a method for the production of ultrafine and uniformly shaped silicone rubber powder by a method which is advantageous from the standpoint of lower energy costs relative to prior art methods.

SUMMARY OF THE INVENTION

The object of the present invention is achieved by blending the ingredients of a curable liquid silicone rubber composition within a specified temperature range and spraying the composition into heated air to form a cured powder.

DETAILED DESCRIPTION OF THE INVENTION

This invention provides an improved method for producing a silicone rubber powder comprising the steps of preparing a liquid silicone rubber composition by blending together the ingredients of said composition, spraying said composition into air to form particles, curing said particles, and recovering the resultant silicone rubber powder. The improvement comprises blending the ingredients of said silicone rubber composition at a temperature of from −60° to +5° C., inclusive, maintaining said composition with this temperature range until it is sprayed, spraying said composition into hot air at a temperature of from +80° C. to +200° C. in order to effect curing of said composition in the sprayed state, and recovering the resultant silicone rubber powder.

By way of explanation of the present method, the liquid silicone rubber composition used in the present method is a liquid or paste at room temperature, and comprises a liquid, reactive group-containing organopolysiloxane, a crosslinker for the organopolysiloxane and/or a curing catalyst. The composition cures to a rubbery elastomer by standing at ambient temperature or by heating. Sag and non-sag types of compositions are permissible. The types of curing mechanisms include addition-reaction types, organoperoxide-based radical reaction-curing types, and condensation-reaction types. Compositions which cure by an addition reaction are preferred due to their rapid curing rates and uniformity of curing. Particularly preferred as such addition-reacting liquid silicone rubber compositions in the present invention are liquid silicone rubber compositions composed of (A) an organopolysiloxane having at least two lower alkenyl radicals in each molecule, (B) an organohydrogenpolysiloxane having at least 2 silicon-bonded hydrogen atoms in each molecule, and (C) a catalyst selected from platinum group metals and compounds thereof, the quantity of said catalyst being sufficient to provide from 0.1 to 1,000 weight parts of platinum-group metal for every one million weight parts of the combined weight of components (A) and (B).

To ensure adequate curing the sum of the average number of alkenyl radicals per molecule of component (A) and the average number of silicon-bonded hydrogen atoms per molecule of component (B) is greater than 4.

Component (A) is the principal ingredient of the liquid silicone rubber composition, and this component reacts by addition and cures with component (B) in the presence of component (C). Component (A) must contain at least 2 lower alkenyl radicals bonded to silicon in each molecule. When fewer than 2 lower alkenyl groups are present a good cured product will not be obtained because a network structure cannot be formed. Suitable lower alkenyl radicals are exemplified by vinyl, allyl, and propenyl. These lower alkenyl radicals can be present at any location on the molecule, but they are preferably present at least at the molecular terminals. Furthermore, while the molecular configuration of this component can be straight chain, branch-containing straight chain, cyclic, or network, a straight chain configuration, possibly slightly branched, is preferred.

The molecular weight of component (A) is not specifically restricted. The viscosity of this component can range from that of a low-viscosity liquid to a very high-viscosity gum, however, the viscosity at 25° C. is preferably at least 100 cP (0.1 Pa.s) in order to obtain a rubbery elastomeric cured product.

Specific examples of component (A) include vinylpolysiloxanes, methylvinylsiloxane-dimethylsiloxane copolymers, dimethylvinylsiloxy-terminated dimethylpolysiloxanes, dimethylvinylsiloxy-terminated dimethylsiloxane-methylphenylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers, trimethylsiloxy-terminated dimethylsiloxane-methylphenylsiloxane-methylvinylsiloxane copolymers, dimethylvinylsiloxy-terminated methyl(3,3,3-trifluoropropyl)polysiloxanes, dimethylvinylsiloxy-terminated dimethylsiloxane-methyl(3,3,3-trifluoropropyl)siloxane copolymers, and polysiloxanes composed of $CH_2=CH(CH_3)_2SiO_{\frac{1}{2}}$ units, $(CH_3)_3SiO_{\frac{1}{2}}$ units and $SiO_{4/2}$ units. Combinations of the aforementioned organopolysiloxanes can also be used in the present invention.

Component (B) of the curable composition is the crosslinker for component (A), and curing proceeds by the addition reaction of the lower alkenyl radicals in component (A) with the silicon-bonded hydrogen atoms in this component under the catalytic activity of component (C). Component (B) must contain at least 2 silicon-bonded hydrogen atoms in each molecule in order to function as a crosslinker.

The sum of the average number of alkenyl radicals in each molecule of the aforesaid component (A) and the average number of silicon-bonded hydrogen atoms in each molecule of component (B) must be greater than 4. It is undesirable for this sum to be 4 or less because a network structure essentially cannot then be formed and an excellent powder cannot be obtained.

The molecular configuration component (B) is also not specifically restricted, and can be, for example, straight chain, branch-containing straight chain and cyclic. While the molecular weight of this component is similarly not specifically restricted, the viscosity at 25° C. is preferably from 1 to 50,000 cP (0.001 to 50 Pa.s) in order to obtain good miscibility with component (A).

Component (B) is preferably added in a quantity defined by the condition that the molar ratio of the total quantity of silicon-bonded hydrogen atoms in this component to the total quantity of all lower alkenyl radicals in component (A) is from 0.5 to 20. A good curability cannot be obtained at a molar ratio below 0.5, while at above 20 there is a tendency for the hardness to increase when the cured material is heated. If in addition to components (A) and (B) the curable composition contains an organosiloxane having a large number of alkenyl radicals per molecule for the purpose of reinforcement or other reason, it is preferred that additional component (B) be present to compensate for these alkenyl radicals.

Specific examples of component (B) are trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylsiloxane-methylhydrogensiloxane cyclic copolymers, copolymers composed of $(CH_3)_2HSiO_{\frac{1}{2}}$ units and $SiO_{4/2}$ units, and copolymers composed of $(CH_3)_3SiO_{\frac{1}{2}}$ units, $(CH_3)_2HSiO_{\frac{1}{2}}$ units, and $SiO_{4/2}$ units.

Component (C) is a catalyst for addition reaction of silicon-bonded hydrogen atoms with alkenyl radicals. Suitable catalysts include metals from the platinum group of the periodic table of the elements and compounds thereof. Specific examples of these catalysts include chloroplatinic acid, chloroplatinic acid dissolved in an alcohol or a ketone and these solutions which have been ripened, chloroplatinic acid-olefin complexes, chloroplatinic acid-alkenylsiloxane complexes, chloroplatinic acid-diketone complexes, platinum black, and platinum supported on a carrier.

The catalyst is present in an amount equivalent to from 0.1 to 1.000 weight parts of a platinum-group metal for every one million weight parts of the combined quantity of components (A) plus (B). The crosslinking reaction will not proceed satisfactorily at below 0.1 weight part of catalyst, while exceeding 1.000 weight parts is uneconomical. The addition of from about 1 to about 100 weight parts of catalyst based on platinum-group metal content is preferred in the typical case.

Fillers can be blended into the liquid silicone rubber composition used in the present invention in order to regulate fluidity or improve the mechanical strength of the silicone rubber powder. These fillers are exemplified by reinforcing fillers such as precipitated silica, fumed silica, calcined silica, and fumed titanium dioxide; and by non-reinforcing fillers such as quartz powder, diatomaceous earth, asbestos, aluminosilicic acid, iron oxide, zinc oxide, and calcium carbonate.

These fillers can be used as is, or their surfaces may be treated with an organosilicon compound such as hexamethyldisilazane, trimethylchlorosilane or polymethylsiloxane. The use in the present liquid silicone rubber compositions of a small or very small quantity of an addition reaction-inhibiting additive such as an acetylenic compound, a hydrazine, a triazole, a phosphine, or a mercaptan, is permissible unless this adversely affects the object of the invention.

Other optional ingredients that can be present in the curable composition include but are not limited to pigments, heat stabilizers, flame retardants, plasticizers and organopolysiloxanes having 1 alkenyl group per molecule in order to generate a low modulus.

A second type of preferred curable liquid silicone rubber composition contains an organic peroxide as the curing agent and cures by a free radical reaction. These compositions comprise a vinyl-containing diorganopolysiloxane which is liquid at room temperature and a catalytic quantity of the organoperoxide. Optional ingredients include but are not limited to fumed silica and precipitated silica, heat stabilizers and pigments.

The organoperoxide selected is preferably from among those with a decomposition temperature in the range of from 25° to 100° C.

It is essential for the purposes of the present method that the ingredients of the curable liquid silicone rubber composition be blended at low temperatures. The mixing temperature is to be within the range of from $-60°$ to $+5°$ C., inclusive, and preferably within the range of from $-30°$ to 0° C. The organopolysiloxane used in the present invention tends to gel at below $-60°$ C., and as a consequence cannot be sprayed. On the other hand, the curing reaction proceeds during mixing at above $+5°$ C., and the ability of the composition to be sprayed is again problematic. In addition, the obtained cured product will have a non-uniform shape.

The liquid silicone rubber composition described in the preceding paragraphs is cured in the sprayed, particulate state by spraying the composition into air that is heated at a temperature of from $+80°$ to 200° C., and preferably from $+100°$ to 180° C. This curing temperature should not fall below $+80°$ C. because the curing rate of the liquid silicone rubber composition then declines, and the productivity is reduced as a consequence. Exceeding 200° C. is disadvantageous in terms of the apparatus and energy costs.

Using the invention's method for producing spray-cured material, it is possible to obtain a product ranging from a spherical cured material with diameters of several hundred microns to microspheres with particle sizes of several tens of millimicrons to several hundred millimicrons. Furthermore, by adjusting the molecular weight and viscosity of the starting polymer, it is possible to produce a spherical cured material with larger particle sizes. Devices suitable for use in the production method of the present invention, include but are not limited to, spray driers which use a hot-air current, and spray reaction devices wherein the interior of the device is exposed to high-energy radiation.

The following examples describe preferred embodiments of the present method and should not be interpreted as limiting the scope of the invention defined in the accompanying claims. All parts and percentages reported in the examples are by weight and all viscosity values were measured at 25° C.

EXAMPLE 1

6 Parts trimethylsiloxy-terminated methylhydrogenpolysiloxane having a viscosity of 100 cP (0.1 Pa.s) and a silicon-bonded H content of 1 wt % was added and mixed into 100 parts of a dimethylvinylsiloxy-terminated dimethylpolysiloxane having a viscosity of 500 cP (0.5 Pa.s) and a vinyl radical content of 0.5 wt % to yield a mixture (mixture A) having a viscosity of 5 P (0.5 Pa.s) as measured by a rotary viscometer.

0.3 Part of a chloroplatinic acid-sym-divinyltetramethyldisiloxane complex containing 4.5 wt % platinum was added and mixed into 100 parts of the same type of dimethylpolysiloxane as described for mixture A to yield a mixture (mixture B) similar to that described above. Mixture A was placed in a liquid silicone rubber composition tank, and mixture B was likewise placed in a separate liquid silicone rubber composition tank. The contents of each tank was cooled to −40° C., and mixtures A and B were then blended by feeding them in a 1:1 weight ratio into a static mixer (Kenics Corp., 20 elements) which had also been cooled to −40° C. In order to effect curing in the sprayed state, the resulting liquid silicone rubber composition was then sprayed into a spray drier (diameter=2m, height=4m) using a rotary nozzle. The spray operating conditions were a discharge rate of 50 kg/hour and an air temperature of 140° C. The resultant cured product was collected via a cyclone to obtain a silicone rubber powder.

The diameter of the cured powder ranged from 5 to 60 microns as determined by observations made using a scanning electron microscope, and 90% of the cured powder was perfectly spherical, bubble-free, and completely uniform.

For comparison, a liquid silicone rubber was prepared using the same procedure and ingredients described in the preceding portion of this example, with the exception that the internal temperature of the static mixer was room temperature (20° C.). This was sprayed and cured in the sprayed state in the spray drier precisely as described above to yield a non-uniformly shaped silicone rubber powder. Furthermore, during a long-term spraying operation, gelled material was generated in the vicinity of the rotary nozzle, and spraying was no longer feasible.

EXAMPLE 2

10 Parts of Denka Black with a surface area of 70 m²/g (conductive carbon black from Denki Kagaku Kogyo Kabushiki Kaisha) and 3 parts trimethylsiloxy-terminated methylhydrogenpolysiloxane having a viscosity of 10 cP (0.01 Pa.s) and a silicon bonded hydrogen content of 1 wt % were added and mixed into 100 parts of a dimethylvinylsiloxy-terminated dimethylpolysiloxane having a viscosity of 2,000 cP (2 Pa.s) and a vinyl group content of 0.25 wt %. The viscosity of the resultant composition (mixture A) was 20P (2 Pa.s).

A mixture similar to the above (mixture B) was obtained by adding and mixing 0.3 part of an isopropanol solution of chloroplatinic acid solution, equivalent to a platinum content of 3%, and 10 parts of the same Denka Black described for Mixture A of this example into 100 parts of the same dimethylpolysiloxane used in mixture A of this example. Mixtures A and B were placed in separate tanks as described in Example 1, and the contents of each tank was then cooled to −10° C. Mixtures A and B were then mixed by feeding them in a 1:1 weight ratio into a static mixer (Kenics Corp., 20 elements) which had been cooled to −10° C. The resulting liquid silicone rubber composition was sprayed into a spray drier using the apparatus described in Example 1 in order to effect curing in the sprayed state. The conditions in the drier were a discharge rate of 50 kg/hour and an air temperature of 170° C. The cured product was collected using a cyclone apparatus to obtain a silicone rubber powder.

This cured powder had diameters ranging from 10 to 100 microns as determined by observation using scanning electron microscopy, and 90% of the cured powder was perfectly spherical, bubble-free, and completely uniform.

That which is claimed is:

1. In a method for producing a silicone rubber powder comprising the steps of preparing a curable liquid silicone rubber composition by blending together the ingredients of said composition, spraying said composition into air to form particles, curing said particles, and recovering the resultant silicone rubber powder, the improvement comprising blending the ingredients of said composition at a temperature of from −60° to 5° C., inclusive, maintaining the temperature of said composition within this range until it is sprayed, spraying said composition into hot air at a temperature of from +80° to +200° C. to effect curing of said composition in the sprayed state, and recovering the resultant silicone rubber powder.

2. A method according to claim 1, where said liquid silicone rubber composition comprises
   (A) an organopolysiloxane having at least 2 lower alkenyl radicals in each molecule,
   (B) an organohydrogenpolysiloxane having at least 2 silicon-bonded hydrogen atoms in each molecule, and
   (C) a platinum-type catalyst in a quantity sufficient to provide from 0.1 to 1.000 weight parts platinum-group metal for every one million weight parts of the combined quantity of components (A) and (B) and wherein the sum of the average number of alkenyl groups per molecule of component (A) and the average number of silicon bonded hydrogen atoms per molecule of component (B) is greater than 4.

3. A method according to claim 2 where said organopolysiloxane is a dimethylvinylsiloxy-terminated dimethylpolysiloxane, the organohydrogensiloxane is a trimethylsiloxy-terminated methylhydrogenpolysiloxane, the concentration of said catalyst is equivalent to from 1 to 100 weight parts of platinum per million weight parts based on the combined weights of components (A) and (B).

4. A method according to claim 3 where the ingredients of said composition are blended at a temperature of from −30° to 0° C. and the composition is sprayed into air maintained at a temperature of from 100° to 180° C. to effect curing.

* * * * *